United States Patent [19]

Bakewell

[11] Patent Number: 4,636,812

[45] Date of Patent: Jan. 13, 1987

[54] THERMAL PRINT HEAD TEMPERATURE CONTROL

[75] Inventor: Joseph J. Bakewell, Boxford, Mass.

[73] Assignee: Dynamics Research Corporation, Wilmington, Mass.

[21] Appl. No.: 790,836

[22] Filed: Oct. 24, 1985

[51] Int. Cl.[4] .............................................. G01D 15/10

[52] U.S. Cl. ........................... 346/76 PH; 346/139 C; 400/120; 219/543; 338/306

[58] Field of Search ............ 346/76 PH, 76 K, 139 C; 400/120; 338/306; 219/216 PH, 216 R, 543

[56] References Cited

U.S. PATENT DOCUMENTS 4,386,360 2/1986 Murayama et al. ............ 346/76 PH 4,399,348 8/1983 Bakewell ......................... 346/76 PH 4,415,403 11/1983 Bakewell ......................... 346/76 PH

*Primary Examiner*—Arthur G. Evans

*Attorney, Agent, or Firm*—Weingarten, Schurgin, Gagnebin & Hayes

[57] ABSTRACT

A thermal print head formed of a laminated sandwich structure, an edge of which serves as the print-head surface. Electrodes are carried on dielectric sheets, the electrodes having ends in contact with a layer of resistive material on the print head surface. When power is applied to selected electrodes, portions of the resistive material are heated, forming printing elements which mark thermal paper confronting the print-head surface. A heater and heat sensor are supported within the laminated structure on a separate dielectric surface from the electrodes, the heater and heat sensor being operative in combination with a temperature regulator to maintain the print head at a predetermined temperature.

7 Claims, 3 Drawing Figures

THERMAL PRINT HEAD TEMPERATURE CONTROL

FIELD OF THE INVENTION

This invention relates to thermal printing and more particularly to a thermal print head and method of fabricating such a print head.

BACKGROUND OF THE INVENTION

Thermal print heads are known for dot matrix printing on a writing surface. Generally, writing is accomplished by means of an array of resistive elements disposed in one or more rows along the surface of the print head. These resistive elements are heated when power is applied across them, thereby marking thermally sensitive paper disposed across the print-head surface. Alphanumeric or other characters are formed by selective energization of the resistive elements of the array on the print-head surface for selected periods of time, while the writing surface or paper moves relative to the print head.

The speed with which such printing can be accomplished has generally been limited by the amount of time required to bring a resistive element to the appropriate temperature to mark the writing surface, and conversely the amount of time required for the resistive element to cool and cease marking the paper. It is preferred to maintain the temperature of the resistive elements at a point just below that necessary to mark the writing surface, thereby permitting more rapid heating of the resistive elements to the temperature required to print, and resultant improvement in printing efficiency.

SUMMARY OF THE INVENTION

A thermal print head is constructed by laminating multiple sheets of dielectric material to form a sandwich structure, one edge of which serves as the print-head surface. Within the laminated structure, electrodes are carried on the planar surfaces of appropriate dielectric sheets so that the electrodes make electrical contact with a layer of resistive material on the print-head surface. When power is applied to selected electrodes, portions of the resistive material are heated and serve as printing elements which mark thermal paper as it moves relative to the print-head surface.

A heater and a heat sensor are carried in the laminate structure on a dielectric planar surface different from those carrying the electrodes. The heater and heat sensor operate in combination with a temperature regulator to maintain the print head at a predetermined temperature. By including these temperature control means within the laminated structure on a separate layer, the arrangement of printing elements is not disturbed, construction of the head is simplified, and temperature is accurately maintained.

The flexibility of construction when using a laminated structure allows the array of printing elements and the placement of heater/sensor layer to be altered in various combinations.

DESCRIPTION OF THE DRAWINGS

The present invention will be more fully understood by referring to the following detailed description in conjunction with the accompanying drawings of which.

DETAILED DESCRIPTION OF THE INVENTION

Figure 1:
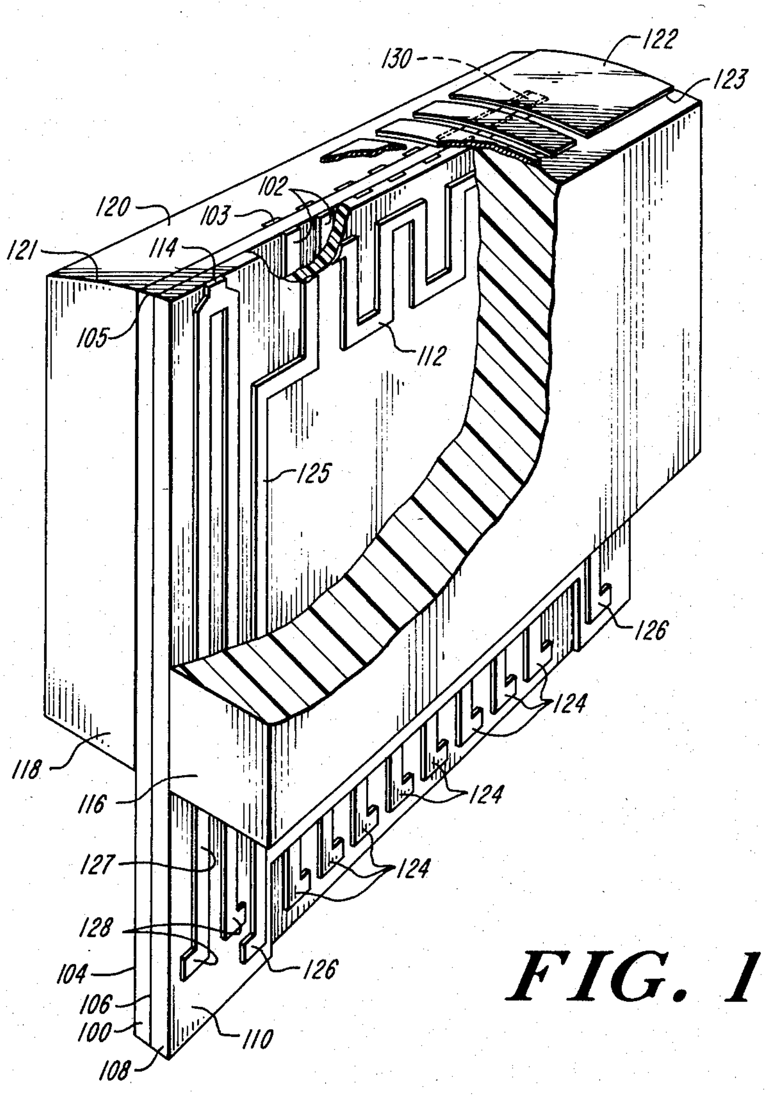
FIG. 1 is a cutaway perspective view of a thermal print head according to this invention.

FIG. 1 illustrates a thermal print head with a central dielectric support 100 and multiple electrodes 102 carried on surfaces 104 and 106 of support 100. The electrodes present edges 103 on the same plane as edge 105 of support 100. Immediately adjacent to support 100 and opposing surface 106 thereof is a dielectric substrate 108 with substantially planar surface 110 onto which a heating element 112 and a heat sensor 114 are carried.

Central support 100 and substrate 108 are planar dielectric sheet members, laminated to form a sandwich structure and clamped together by end pieces 116 and 118. This laminated construction allows for easy addition of planar members into the head, if so desired. The top portion 120 of the head forms a generally smooth curved surface 121 onto which a resistive material 122 is adhered. The resistive material 122 is in the form of spaced layers, each in electrical contact with edges 103 of confronting pairs of electrodes 102.

Substrate 108 has a rectangular portion cut-away at the bottom in order to expose contact pads 124 connected to the electrodes on surface 106. An identical set of pads (not shown) is located at the bottom of substrate 100 on surface 104 and is connected to electrodes thereon. Contact pads 126 connect to conductive paths 125 which in turn connect to the heating element 112, and contacts pads 128 connect to conductive paths 127 which in turn connect to heat sensor 114. The contact pads can be electrically coupled to associated control circuitry by a conventional electrical connector.

Figure 2:
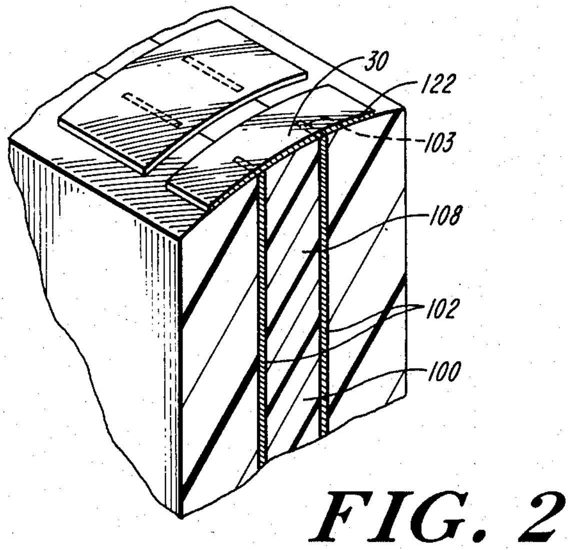
FIG. 2 is a cutaway perspective view illustrating the writing end of the embodiment of FIG. 1.

In operation, power is applied across a selected pair of electrodes 102, such as those in FIG. 2, thereby heating up resistive layer 130 to a temperature sufficient to thermally mark thermal paper (not shown) as it moves across the print-head surface. The entire head is oriented orthogonal to the plane of the moving thermal paper and all connections, electrical and mechanical, are made to the head at some distance from the thermal print paper.

Referring again to FIG. 1, heat sensor 114 and heating element 112 are carried in the print head on surface 110 of a separate substrate, thus avoiding any interference with the disposition of printing elements 130 and the thermal marking operations of the head. The heater and heat sensor are in sufficient proximity to the printing elements to provide the intended degree of thermal control. The heat sensor 114 is, for example, of bimetal or thermistor construction. The heating element 112 is constructed of suitable resistive material, such as Nichrome, and is preferably disposed in a serpentine configuration on surface 110.

Figure 3:
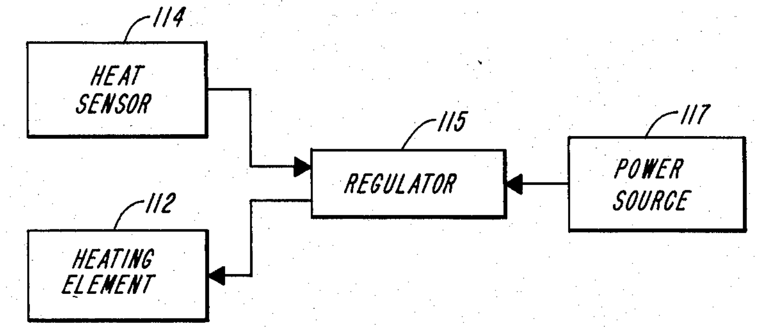
FIG. 3 is a block diagram of a heater control system useful in the invention.

As seen in the block diagram of FIG. 3 the heat sensor 114 electrically connects to the heat regulator 115. When the heat sensor 114 detects a predetermined upper temperature, it signals regulator 115 to switch off the power from source 117 to heating element 112. Similarly, when the heat sensor 114 detects a second predetermined lower temperature, it signals regulator 115 to switch on the power from source 117 and cause the heating element 112 to heat up the print head. Through this closed-loop control of the heating element, the print head is maintained at a temperature just below the temperature necessary to mark the thermal paper. This lessens the amount and the increment of electric power needed to bring the resistive layers 130 to the temperature required to thermally mark the paper, thus realizing a more efficient printing operation.

Referring again to FIG. 1, it will be appreciated that electrodes 102 are patterned onto the surfaces of support 100 and have a finite thickness. Adhesive may be applied to portions of the surface not carrying the electrodes 102 so as to fill in the space required by the thickness of the electrodes. This may be accomplished by selective adhesive patterning or may be accomplished by conventional potting techniques. In an alternative embodiment (not shown), the electrodes may be recessed into the central dielectric support 100. In this way, when the support 100 is sandwiched by substrate 108 and end piece 118, all opposing surfaces are flush with each other. No filler material is needed. The treatments detailed above for electrodes 102 apply equally to heating element 112 and heat sensor 114. Since the electrodes, heating element and heat sensor can all be generally on the order of 1 mil thickness, merely applying adhesive over all internal surfaces not occupied by electrodes, heat sensors or heating elements suffices to make all opposing surfaces flush.

The invention can also be embodied in a print head having dual or other multiple rows of printing elements. The heater and heat sensor sheet can be disposed in sufficient proximity to the printing element to achieve intended thermal control. Alternatively, a separate heater and heat sensor sheet can be provided for each row of printing elements.

Having above indicated several embodiments of the present invention, it will occur to those skilled in the art that modifications and alternatives can be practiced within the spirit of this invention. It is accordingly intended to define the scope of the invention only as indicated in the following claims.

What is claimed is:

1. A thermal print head comprising:

a first sheet of dielectric material having a plurality of electrodes on a first surface thereof, each electrode having an end terminating at a common edge of the sheet, the electrode ends being regularly spaced along the length of the edge, and each of the electrodes having a contact area, said first sheet of dielectric material also having a plurality of electrodes on a second surface thereof, each electrode having an end terminating at the common edge of the sheet, the electrode ends being regularly spaced along the length of the edge, and each of the electrodes having a contact area;

a second sheet of dielectric material having on a surface thereof an electrical heating element and a heat sensor, said heat sensor being located at an edge of said second sheet, and said heating element being located adjacent to the edge of said second sheet at which said heat sensor is located;

said first and second sheets being disposed in laminar engagement, with the heating element and heat sensor of said second sheet being contiguous with the electrode ends of the first and second surfaces of said first sheet; and a resistive material interconnecting the contiguous electrode ends along the contiguous edges of the first and second surfaces.

2. In a thermal print head which includes one or more layers of dielectric material having a plurality of electrodes terminating in electrode ends at a common edge of the laminated structure, and resistive material interconnecting the electrode ends to provide electrically energized thermal writing elements, heat control means comprising:

a heater layer of dielectric material provided in the laminated structure and having on a surface thereof a planar electrical heating element disposed along an edge contiguous with the electrode ends of the laminated structure, and a planar heat sensor located at said edge of said heater layer;

means on the surface of the heater layer for applying electrical current to the heater element; and means on the surface of the heater layer for receiving signals provided by the heat sensor.

3. A thermal print head comprising:

a plurality of writing elements disposed along an edge of a laminated heat structure, said edge being the writing edge of said print head, each of the writing elements including a resistive layer at the writing edge and electrodes extending from the resistive layer to contact areas by which electrical power can be applied to the resistive layer; and heating means disposed contiguous with the array of writing elements and including a layer of dielectric material sandwiched with the laminated structure of the print head and having on a surface thereof a planar heating element disposed along an edge of the layer contiguous with the writing elements and operative to heat the writing elements to a predetermined temperature, and a heat sensor located at said edge of said layer of dielectric material contiguous with the writing elements and operative to sense the operating temperature of the writing elements.

4. The print head of claim 3, wherein said heating element and said heat sensor are electrically connected via conductive paths to contact areas.

5. The print head of claim 4 wherein the electrodes are disposed on respective surfaces of a dielectric sheet of the laminated structure; and wherein the layer of dielectric material containing the heating means is contiguous with a surface of the sheet containing the electrodes.

6. The print head of claim 5 further including first and second support members between which the electrode layer and heating means layer are disposed.

7. The print head of claim 3 wherein the resistive layer of each of the writing elements is electrically isolated from adjacent resistive layers.

* * * * *